March 25, 1947. C. R. SODERBERG 2,417,845
TURBINE CONSTRUCTION
Filed Jan. 28, 1944 2 Sheets-Sheet 1

INVENTOR
Carl R. Soderberg
Charles A. Warren
ATTORNEY

March 25, 1947.  C. R. SODERBERG  2,417,845
TURBINE CONSTRUCTION
Filed Jan. 28, 1944  2 Sheets-Sheet 2

INVENTOR
Carl R. Soderberg
Charles A. Warren
ATTORNEY

Patented Mar. 25, 1947

2,417,845

UNITED STATES PATENT OFFICE 2,417,845

TURBINE CONSTRUCTION

Carl R. Soderberg, Weston, Mass., assignor to United Aircraft Corporation, East Hartford, Conn., a corporation of Delaware Application January 28, 1944, Serial No. 520,066

11 Claims. (Cl. 253—39)

This invention relates to a turbine driven by hot gases and particularly adapted for use in aircraft propulsion.

The copending application of Cronstedt, Serial No. 486,617, describes a turbine in which a housing supports both the turbine casing carrying rows of nozzles and rotor having rows of blades alternating with the nozzles. Power fluid enters the casing through an intake scroll and is discharged from the other end of the casing. A feature of this invention is a support for the rotor at the discharge end of the casing.

Another feature of the invention is a bearing mounting for supporting the end of the turbine rotor, the mounting being free to expand radially within the supporting housing during operation of the turbine.

Another feature of the invention is an exhaust duct which extends around the bearing mounting and is supported within the housing by the same structure that supports the mounting.

In accordance with the invention, the mounting is held in position by supporting pins which extend radially inward from the housing and extend through an opening in the duct for maintaining alignment of the duct and mounting within the housing.

Other objects and advantages will be apparent from the specification, claims and from the accompanying drawings which illustrate an embodiment of the invention.

Figure 1:
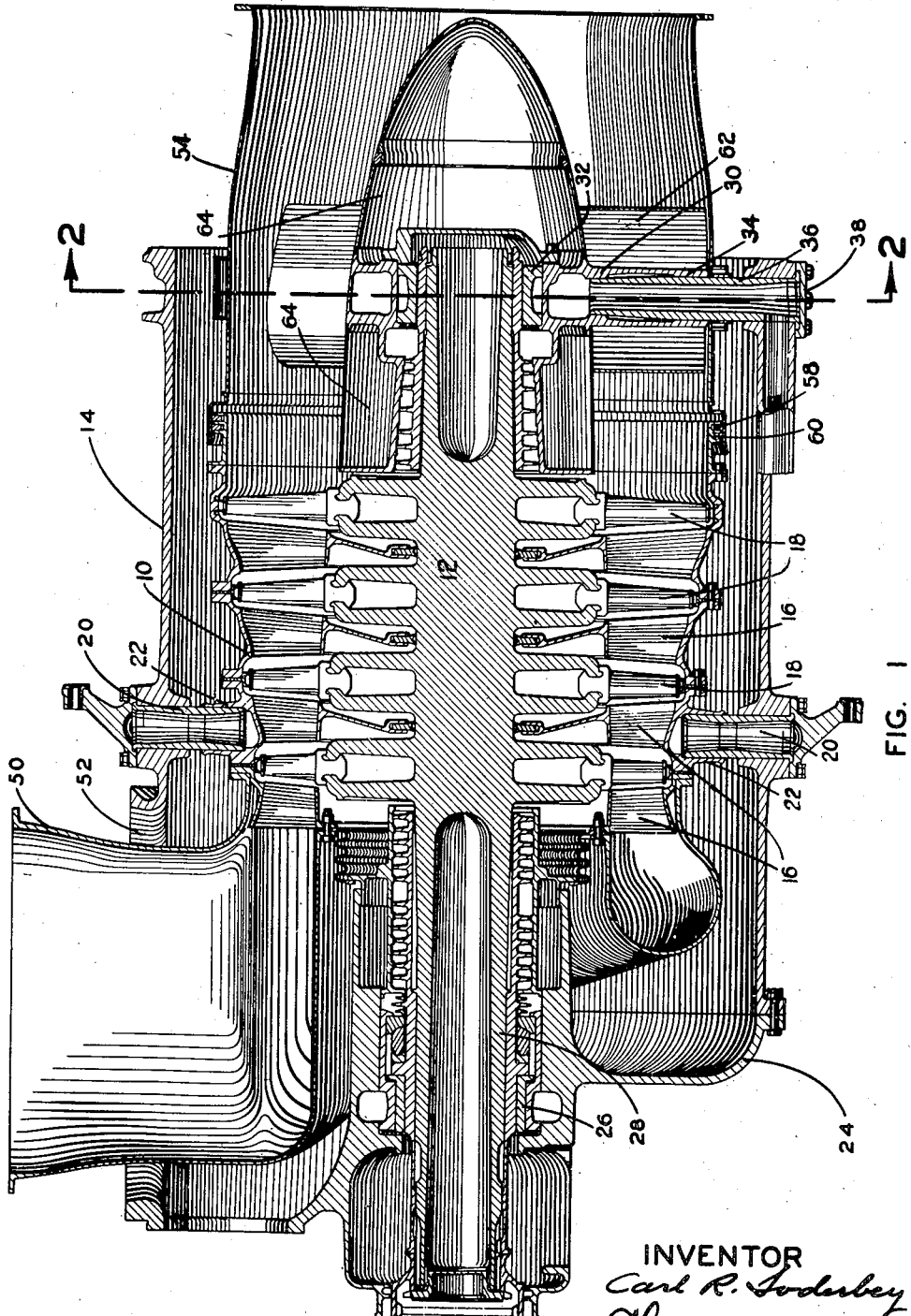
Fig. 1 is a sectional view through the turbine, the rear end bearing section being along the line 1—1 of Fig. 2.
Figure 2:
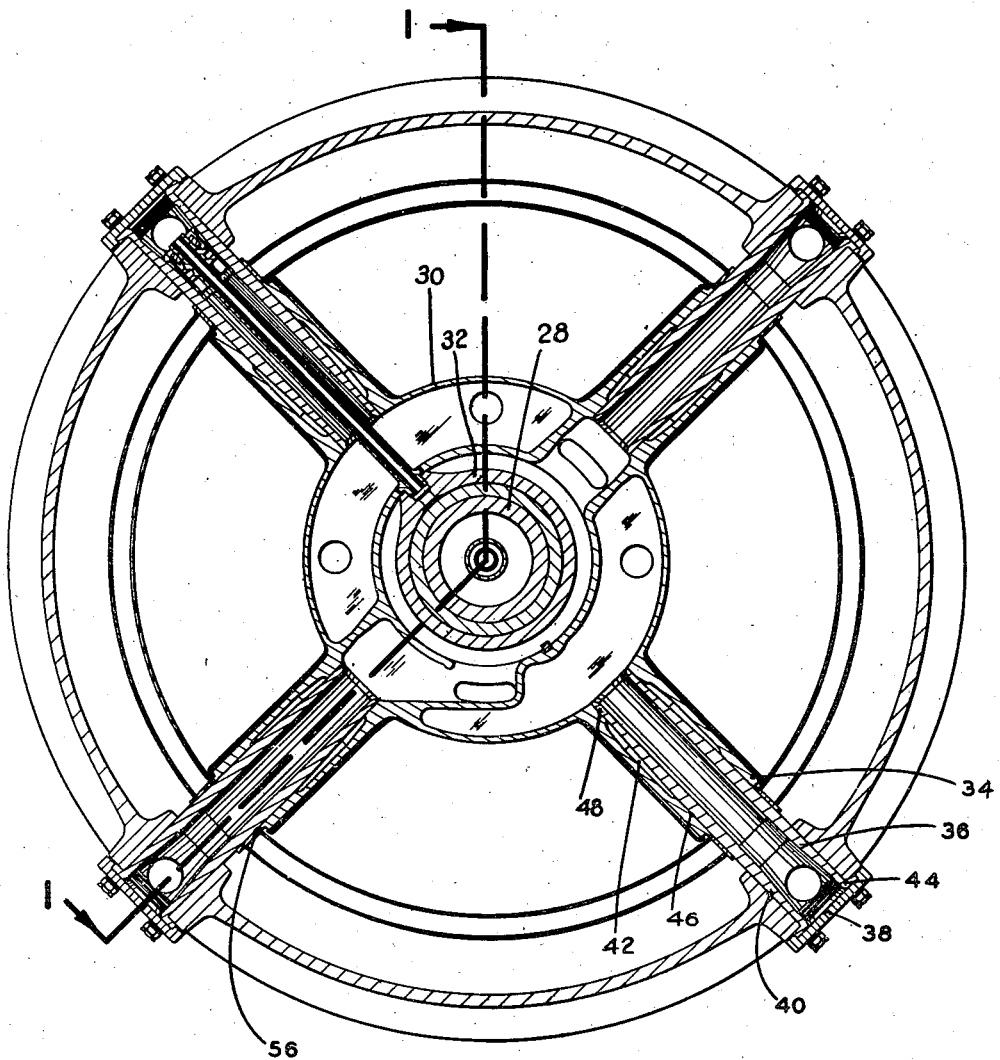
Fig. 2 is a sectional view through the rear bearing and its supporting structure.

The turbine shown has a casing 10 and a rotor 12, both supported by a housing 14. Casing 10 has several parallel rows of circumferentially spaced nozzle-forming vanes 16 which alternate with rows of blades 18 on the rotor. The part of the rotor having these blades and the part of the casing having the vanes constitute the power section of the turbine.

Casing 10 is supported by radial pins 20 carried by the housing and engaging bosses 22 in the casing. These pins are all in the same radial plane and constitute the sole support for the casing. The casing is free to expand axially within the housing and is smaller in diameter than the housing at its plane of support, thus permitting the casing to expand radially without destroying its concentric alignment. Clearance is provided at the inner ends of pins 20 for radial expansion of the casing.

Housing 14 has a head 24 which forms a part of the housing and supports a bearing 26 for the front end of the turbine shaft 28, integral with the rotor. At the other end of the rotor is a mounting 30 within which is a bearing 32 for the shaft. Mounting 30 has a number of legs 34 engaging radial supporting pins 36 mounted in the housing and held in position by caps 38.

Pins 34 are slide fits in the openings 40 and 42 in housing 14 and legs 34 and have flanges 44 at their outer ends to be clamped by caps 38 against the housing. The pins float in the legs which have spaced surfaces 46 and 48 which guide the pins and permit axial sliding of the pins in the legs. The outer ends of the legs are spaced from the housing to permit axial expansion of the mounting and legs.

Power gas is conducted into casing 10 by an intake scroll 50 connected to the casing and extending through an opening 52 in the housing to connect with an intake pipe not shown. The scroll is spaced from housing 14 and head 24 so that transfer of heat from the scroll to the housing is minimized. Gas is discharged from casing 10 through a duct 54 surrounding the mounting 30, and is held in concentric relation with the housing by the supporting pins 36 extending through openings 56 in the duct. The inner end of the duct may engage resilient sealing rings 58 in grooves 60 in the casing so that axial expansion of the casing does not affect the position of the duct around mounting 30.

The path for the power gas discharging from the turbine is within the duct and between the legs on the mounting. Each leg may have a surrounding shield 62 which is streamlined to minimize the resistance to the gas flow, and the housing may have a surrounding fairing 64.

It is to be understood that the invention is not limited to the specific embodiment herein illustrated and described, but may be used in other ways without departure from its spirit as defined by the following claims.

I claim:

1. A turbine construction including a housing, a rotor within the housing, a bearing for said rotor, a mounting for the bearing, and radial pins extending through the housing and into the mounting for supporting the mounting and maintaining alignment of housing and the mounting, said pins being slidable in one of the parts in which they are located.

2. A turbine construction including a housing, a rotor within the housing, a bearing for said rotor, a mounting for the bearing, and radial pins extending through the housing and into the mounting for supporting the mounting and maintaining alignment of housing and the mounting, said mounting having radially extending legs receiving the pins.

3. A turbine construction including a housing, a rotor within the housing, a bearing for said rotor, a mounting for the bearing, and radial pins extending through the housing and into the mounting for supporting the mounting and maintaining alignment of the housing and the mounting, said mounting being smaller in diameter than the housing to permit radial expansion of the mounting within the housing, and said pins being slidable in one of the parts in which they are located to permit expansion of the mounting.

4. A turbine construction including a housing, a rotor within the housing, a bearing for said rotor, a mounting for the bearing, and radial pins extending through the housing and into the mounting for supporting the mounting and maintaining alignment of the housing and the mounting, said mounting having radially extending legs receiving the pins, said legs having their outer ends spaced from the housing to permit radial expansion of the mounting within the housing.

5. A turbine construction including a housing, a rotor within the housing, a bearing for said rotor, a mounting for the bearing, and a number of radial pins extending through the housing and into the mounting for supporting the mounting and maintaining alignment of housing and the mounting, the pins being fixed in one of the parts, and guided for radial movement in the other part.

6. A turbine construction including a housing, a rotor within the housing, a bearing for said rotor, a mounting for the bearing, and a number of radial pins extending through the housing and into the mounting for supporting the mounting and maintaining alignment of housing and the mounting, said mounting having radially extending legs receiving the pins, the pins being slidable in the legs.

7. A turbine construction including a housing, a casing within and supported by the housing, a rotor within the casing, a bearing for the rotor, a mounting for the bearing located within the housing, said housing having radial bores adjacent the mounting, and a duct connected to the casing and surrounding the mounting in combination with radial pins in the bores in said housing and engaging and supporting said mounting, said pins also supporting the duct within the housing.

8. A turbine construction including a housing, a casing within and supported by the housing, a rotor within the casing, a bearing for the rotor, a mounting for the bearing supported by the housing and a duct connected to the casing and surrounding the mounting in combination with radial pins connecting said housing and mounting and supporting the duct, said mounting having radially extending legs to receive the pins, the outer ends of the legs engaging the duct.

9. A turbine construction including a housing, a casing within and supported by the housing, a rotor within the casing, a bearing for the rotor, a mounting for the bearing supported by the housing and a duct connected to the casing and surrounding the mounting in combination with radial pins connecting said housing and mounting and supporting the duct, said mounting having radially extending legs to receive the pins, the outer ends of the legs engaging the duct, said duct having openings to receive the pins.

10. A turbine construction including a housing, a casing within and supported by the housing, a rotor within the casing, a bearing for the rotor, a mounting for the bearing supported by the housing and a duct connected to the casing and surrounding the mounting in combination with radial pins connecting said housing and mounting and supporting the duct, said mounting and housing having radial openings for the pins and said pins being slidable in the openings in one of the parts.

11. A turbine construction including a housing, a casing within and supported by the housing, a rotor within the casing, a bearing for the rotor, a mounting for the bearing supported by the housing and a duct connected to the casing and surrounding the mounting in combination with radial pins connecting said housing and mounting and supporting the duct, said mounting and housing having radial openings for the pins and said pins being slidable in the openings in said mounting, and being fixed in the housing.

CARL R. SODERBERG.

REFERENCES CITED

The following references are of record in the file of this patent:

UNITED STATES PATENTS

| Number | Name | Date |
|---|---|---|
| 1,299,709 | Hall | Apr. 8, 1919 |
| 1,748,362 | Noble | Feb. 25, 1930 |
| 2,080,425 | Lysholm | May 18, 1937 |

FOREIGN PATENTS

| Number | Country | Date |
|---|---|---|
| 76,744 | Austrian | June 10, 1919 |